June 2, 1964          G. A. CARLSON          3,135,560
WHEEL ADAPTER FOR BOATS
Filed Sept. 24, 1962
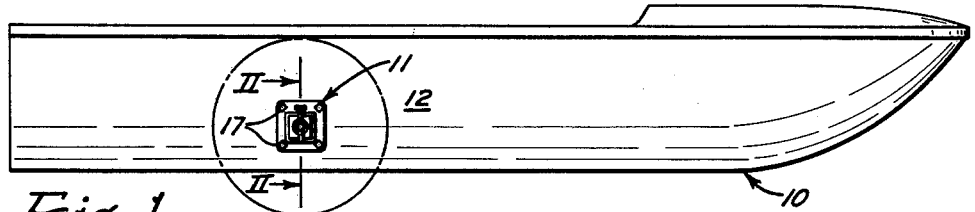
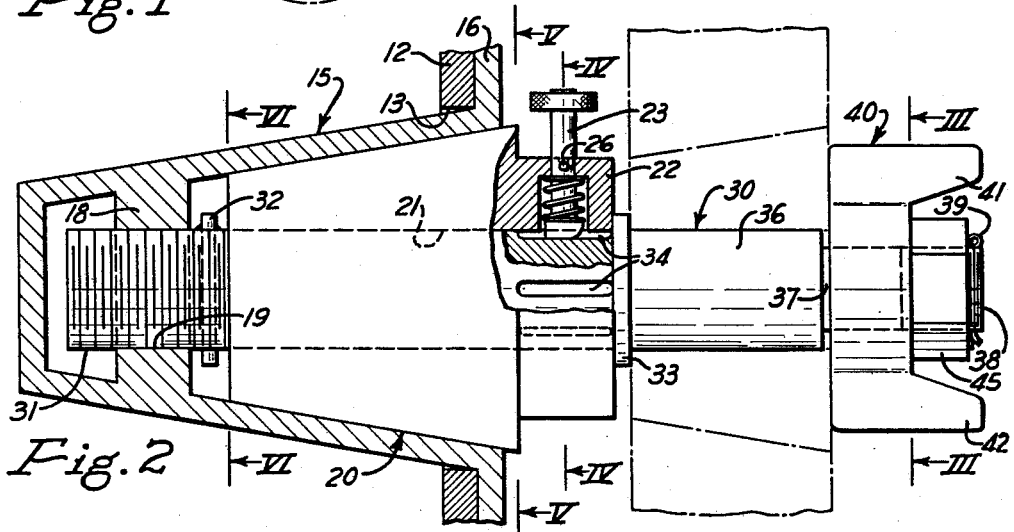
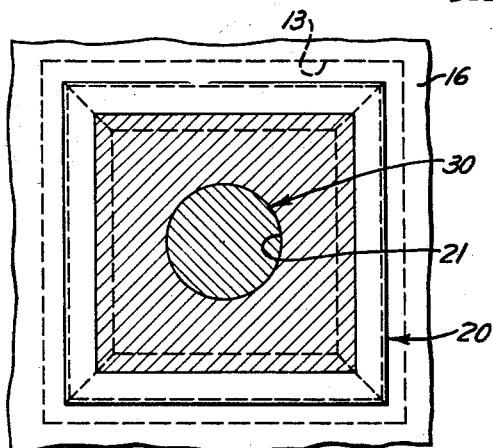
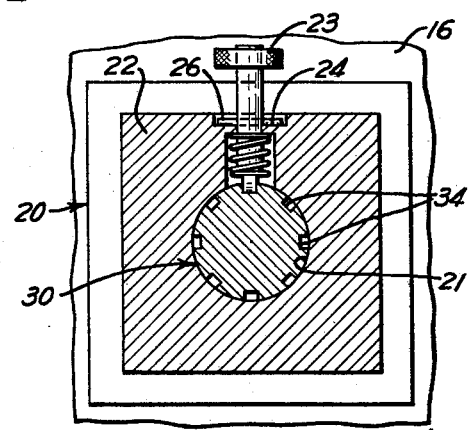
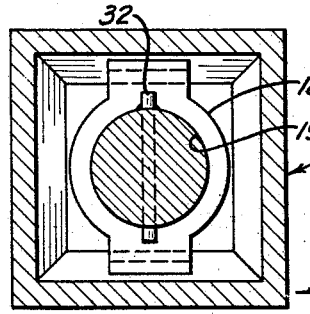
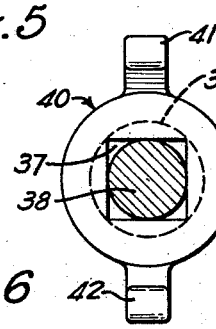
INVENTOR.
GUS A. CARLSON
BY
Robert Bennett Lubic
ATTORNEY

United States Patent Office 3,135,560
Patented June 2, 1964

3,135,560
WHEEL ADAPTER FOR BOATS
Gus A. Carlson, Monessen, Pa. (R.D. 3, Belle Vernon, Pa.), assignor of twenty-five percent to George B. Kessler, Monessen, and twenty-five percent to Emma Louise Garfola, Bridgeville, Pa.
Filed Sept. 24, 1962, Ser. No. 225,802
9 Claims. (Cl. 301—131)

The present invention relates to a wheel adapter for boats, and more particularly to a wheel adapter mounting for boats comprising male and female socket members for securing a removable axle to a boat.

It is desirable to transport small boats by trailing them behind a towing vehicle, such as an ordinary passenger car. This arrangement is desirable where the boat is too large to be carried on or in the car, such as in making trips between the residence of the boat owner and a body of water on which the boat will be used.

The most widely used method of transporting small boats in this manner is to provide a special trailer for carrying the boat, the car being used to tow the trailer with the boat on it between the residence and the body of water. This system has the drawback, however, of requiring a relatively large expenditure for a separate trailer, and thus it is desirable that a more economical solution to the problem of transporting small boats be provided.

The solution has been generally suggested of providing one or another type of wheeled attachments directly to the boat. This approach to the problem is, in general, more desirable than utilizing a separate trailer, since it is a more economical arrangement than the trailer. However, the wheeled attachments for small boats which have heretofore been provided have not been altogether satisfactory for their intended purpose.

Among the deficiencies of the wheel attachments heretofore suggested have been that they are unduly expensive, have been made of numerous parts, have been complex in construction, and have lacked stability.

In one known construction, a wheel shaft or axle was provided with a hand wheel, the axle being tapered at its inner end and being screw threaded, the screw threads engaging in a socket or tube extending in and transversely of the boat. This construction would permit the vibrations necessarily attendant to road transport to loosen the screw threaded connection between the axle and the tube, thus enabling the entire axle and wheel assembly to work loose and become free of the structure attached to the boat: the serious consequences of this arrangement are apparent. In addition, this prior art construction provided the screw threads on the axle intermediate its inner end and the axle section which supported the wheel, and as a result high loads were imposed upon the limited screw thread contact area, thus resulting in extremely high pressure with great danger of the screw threads binding and preventing the removal of the axle when desired.

In other known construction, an axle was inserted into a thimble socket, and held in place by a spring pressed pin extending through the axle and into a pin-receiving hole in the thimble socket. This construction was such that it was difficult to align the axle with the thimble socket for insertion of the axle into the thimble socket, and it was also difficult to align the pin with the pin-receiving hole. This construction was intended for use in connection with an aircraft, and was possibly well suited for its intended purpose but would be obviously unsuitable where an axle is to be assembled to a boat which is in the water and subject to the wave action of the water, thus causing the boat to rock during the assembly operation.

An object of the present invention is to provide a wheel adapter for boats which is economical, strong, and of simple construction.

Another object of the present invention is the provision of a wheel adapter for boats having few parts.

A further object of the present invention is to provide a wheel adapter for boats which, when assembled to the boats, permits the transporting of the boat over long distances with great stability.

Yet another object of the present invention is the provision of a wheel adapter for boats which may be readily assembled to the boat, even while the boat is in motion on the water, and to provide a wheel adapter which is secure against accidental disassembly.

A further object of the present invention is to provide a wheel adapter for boats which permits the adapter to be readily disassembled from the boat when desired.

Other objects and many of the attendant advantages of the present invention will be apparent from the following specification and drawings wherein:

FIG. 1 is an elevational view of a small boat with a wheel adapter in accordance with the present invention attached thereto.

FIG. 2 is a cross sectional view, with parts broken away and in phantom line, of a wheel adapter, the view being taken on the line II—II of FIG. 1.

FIG. 3 is a cross sectional view taken on the line III—III of FIG. 2.

FIG. 4 is a cross sectional view taken on the line IV—IV of FIG. 2.

FIG. 5 is a cross sectional view taken on the line V—V of FIG. 2.

FIG. 6 is a cross sectional view taken on the line VI—VI of FIG. 2.

Referring now to the drawings, wherein like or corresponding parts are designated by like or corresponding reference characters throughout the several views, there is shown in FIG. 1 a boat 10 having a wheel adapter generally designated 11 secured in the side thereof. It will be understood that a similar adapter is secured in the opposite side of the boat 10 from that seen in FIG. 1, and that the adapter supports a wheel indicated in phantom line. The wheel is preferably of the pneumatic type.

Referring now to FIG. 2, there is shown the side 12 of the boat 10 having an appropriate hole 13 therein. Into the hole 13 is inserted a female socket 15 having an outwardly extending peripheral flange 16 lying against the outer side of the boat side 12 and secured thereto as by the boats 17 shown in FIG. 1.

As may best be seen in FIG. 6, female socket 15 is of non-circular cross section, the cross section being generally that of a square in the illustrated preferred construction. Female socket 15 tapers from its outer end to its inner end, and has a web 18 extending transversely adjacent its inner end, web 18 being provided with a screw threaded hole 19 which lies along the axis of the female socket 15.

Cofitting with the female socket 15 is a mating male plug 20 which has a bore 21 extending therethrough along the axis thereof. Male plug 20 is provided with an extension 22 which carries a spring urged detent 23. As may be seen in FIG. 4 the extension 22 has a transverse recess 24 in the top surface thereof which receives a corresponding transverse holding pin 26. Detent 23 may be raised, against the urging of the spring thereof, and rotated so that the holding pin 26 is out of registry with the recess 24, and thereby serves to hold the detent 23 in the withdrawn position.

An axle 30 is provided, having an inner threaded end portion 31 which is screw threaded into the threaded bore 19 in the web 18 of female socket 15. Axle 30 passes through the bore 21 of male plug 20, and is restrained against relative longitudinal movement with respect to male plug 20 by a dowel pin 32 extending through and secured in axle 30 and an integral flange 33 outwardly of extension 22. The section of axle 30 in registry with detent 23 is provided with a plurality of splines 34, these being shown in FIG. 4 as well as in FIG. 2 with the end of detent 23 engaged in one of the splines 34.

Outwardly of flange 33, axle 30 is round in cross section, thereby providing a bearing-receiving section 36. Section 36 of axle 30 receives, when in use, a bearing for a wheel which is carried by the axle 30. Outwardly of section 36 is a square section 37 (see FIG. 3), and finally axle 30 is provided at its outer end with a threaded round section 38. Section 38 has a hole extending transversely thereof for receiving a cotter pin 39.

A hand wheel 40, shown in FIGS. 2 and 3, is provided with an aperture which is of square cross section and mates with the section 37 of axle 30. Preferably, hand wheel 40 is provided with diametrically opposed wings 41 and 42. Threaded on section 38 is a nut 45, nut 45 being preferably castellated to provide for being locked in a suitable adjusted position by the cotter pin 39.

In assembling the apparatus from its several parts, the axle 30 is first passed through the bore 21 in male plug 20, and then the dowel pin 32 is passed through the hole in axle 30 and secured therein, as shown in FIGS. 2 and 6. Detent 23 is placed in the withdrawn position, so that axle 30 may rotate in male plug 20, it being understood that the flange 33 and dowel pin 32 limit relative axial movement between axle 30 and male plug 20. As will be understood, flange 33 may or may not be integral with axle 30, and other means than the pin 32 may be utilized to restrict axial movement of axle 30 in male plug 20. Female socket 15 is placed in the hole 13 in boat side 12, and secured thereto by passing appropriate bolts 17 through the peripheral flange 16.

A wheel with a bearing is then placed over the end 38 of axle 30, until the bearing contacts flange 33. Hand wheel 40 is then placed on the square section 37 of axle 30, the hole therethrough being a mating square hole and the nut 45 is then threaded on the threaded end section 38 of axle 30, nut 45 being screwed sufficiently tight to obtain the proper bearing adjustment. Thereafter, cotter pin 39 is placed in position to secure nut 45.

The assembly of the wheel, axle 30, male plug 20, hand wheel 40 and nut 45 is then advanced towards the female socket 15 until the screw threaded section 31 of axle 30 engages with the screw threaded hole 19 in the web 18. By then turning the hand wheel 40 the screw threaded section 31 is rotated and is screwed into the hole 19 of web 18. After a sufficient amount of rotation, male plug 20 will have seated firmly in female socket 15 and the detent 23 will then be turned from its withdrawn position to the position shown in FIGS. 2 and 4 so that the lower end thereof enters one of the splines 34 of axle 30. This will prevent axle 30 from becoming unscrewed from web 18.

The assembly will remain in the position shown in the drawings during transport of the boat 10 for great distances, and the vibrations of the assemblage will not loosen the parts so as to thereby prevent any accidental disassemblage of the wheel from the boat. Upon arrival at the body of water, the boat 10 is floated upon the water. To remove the wheels, it is only necessary to withdraw detent 23 and rotate it so that it is held in the withdrawn position by the pin 26. Then, by rotating hand wheel 40, the end section 31 of axle 30 will be unscrewed from the web 18 of female socket 15, to thereby permit the axle and wheel assemblage to be disengaged from the female socket 15 and to be completely removed without difficulty from the boat 10.

There has been provided a wheel adapter which is economical of construction, having few, readily fabricated parts. The male plug and female socket, for example, may be cast. The large bearing surface provided by the male plug and female socket causes a minimum of stress on the screw threads on the axle and web of the female socket, thus insuring that they may be readily disassembled. The tapered construction of the male plug and female socket provide for easy assembly, even when the boat is rocking due to wave action. The bearing on the wheel permits extensive use, and there is no altering of the bearing adjustment during assembly and disassembly of the wheel and axle assembly to the female socket.

It will be obvious to those skilled in the art that various changes may be made without departing from the spirit of the invention and therefore the invention is not limited to what is shown in the drawings and described in the specification but only as indicated in the appended claims.

What is claimed is:

1. A wheel adapter for boats and the like comprising an inwardly tapered female socket of non-circular cross section having means thereon for mounting said socket in an opening in a boat side, said female socket having a web adjacent its inner end extending transversely thereof, said web having a screw threaded hole along the axis of said female socket, a mating male socket plug in said female socket having a bore extending axially therethrough, an axle extending through the bore of said male plug and having the inner end thereof screw threaded into the screw threads of said web of said female socket, means securing said male plug on said axle against axial movement relative thereto, splines on said axle, detent means engageable with said splines for selectively permitting or preventing relative rotation of said axle and said male plug, a bearing receiving section on said axle outwardly of said male plug and adapted to receive a bearing for supporting a wheel, a non-circular section on said axle outwardly of said bearing receiving section, a hand wheel having a mating non-circular aperture therethrough positioned on said non-circular section, and a nut threaded on the outer end of said axle and bearing against said hand wheel for effecting proper adjustment of a wheel bearing on said bearing receiving section, and means for securing said nut on said axle.

2. A wheel adapter for boats and the like comprising a female socket of non-circular cross section having means thereon for mounting said socket in an opening in a boat side, said female socket having a web adjacent its inner end extending transversely thereof, said web having a screw threaded hole along the axis of said female socket, a mating male plug in said female socket having a bore extending axially therethrough, an axle extending through the bore of said male plug and having the inner end thereof screw threaded into the screw threads of said web of said female socket, means securing said male plug on said axle against axial movement relative thereto, splines on said axle, a means engageable with said splines for selectively permitting or preventing relative rotation of said axle and said male plug, a bearing receiving section on said axle outwardly of said male plug and adapted to receive a bearing for supporting a wheel, a non-circular section on said axle outwardly of said bearing receiving section, a hand wheel having a mating non-circular aperture therethrough positioned on said non-circular section, and a nut threaded on the outer end of said axle.

3. A wheel adapter for boats and the like comprising a female socket of non-circular cross section having means thereon for mounting said socket in an opening in a boat side, said female socket having a web adjacent its inner end extending transversely thereof, said web having a screw threaded hole along the axis of said female socket, a mating male plug in said female socket and having a bore extending axially therethrough, an axle extending through the bore of said male plug and having the inner end thereof screw threaded into the screw threads of said web of said female socket, means securing said male plug, means securing said male plug on said axle against axial movement relative thereto, detent means for selectively permitting or preventing relative rotation of said axle and said male plug, a bearing receiving section on said axle outwardly of said male plug and adapted to receive a bearing for supporting a wheel, a non-circular section on said axle outwardly of said bearing receiving section, a hand wheel having a mating non-circular aperture therethrough positioned on said non-circular section, and a nut threaded on the outer end of said axle.

4. A wheel adapter for boats and the like comprising a female socket of non-circular cross section, means for mounting said socket in an opening in a boat side, said female socket having female screw threaded means along the axis thereof adjacent its inner end, a mating male plug in said female socket and having a bore extending therethrough, an axle extending through the bore of said male plug and having the inner end thereof screw threaded into the screw threaded means of said female socket, means securing said male plug on said axle against axial movement relative thereto, detent means for selectively permitting or preventing relative rotation of said axle and said male plug, a bearing receiving section on said axle outwardly of said male plug and adapted to receive a bearing for supporting a wheel, a non-circular section on said axle outwardly of said bearing receiving section, a hand wheel having a mating non-circular aperture therethrough positioned on said non-circular section, and a nut threaded on the outer end of said axle.

5. A wheel adapter for boats and the like comprising a female socket of non-circular cross section, means for mounting said socket in an opening in a boat side, said female socket having female screw threaded means along the axis thereof adjacent its inner end, a mating male plug in said female socket and having a bore extending therethrough, an axle extending through the bore of said male plug and having the inner end thereof screw threaded into the screw threaded means of said female socket, means securing said male plug on said axle against axial movement relative thereto, detent means for selectively permitting or preventing relative rotation of said axle and said male plug, a bearing receiving section on said axle outwardly of said male plug and adapted to receive a bearing for supporting a wheel, a non-circular section on said axle outwardly of said bearing receiving section, and a nut threaded on said axle to retain a bearing and wheel thereon.

6. A wheel adapter for boats and the like comprising a female socket of non-circular cross section, said female socket having a web adjacent its inner end extending transversely thereof, a mating male plug in said female socket and having a bore extending therethrough, an axle extending through the bore of said male plug, releasable means on said axle inner end and said female socket for preventing axial movement of said axle, means securing said male plug on said axle against axial movement relative thereto, means for selectively permitting or preventing relative rotation of said axle and said male plug, a bearing receiving section on said axle outwardly of said male plug and adapted to receive a bearing for supporting a wheel, a non-circular section on said axle outwardly of said bearing receiving section, and a nut threaded on said axle to retain a bearing and wheel thereon.

7. A wheel adapter for boats and the like comprising a female socket of non-circular cross section, said female socket having a web adjacent its inner end extending transversely thereof, a mating male plug in said female socket and having a bore extending therethrough, an axle extending through the bore of said male plug, releasable means on said axle inner end and said female socket for preventing axial movement of said axle, means securing said male plug on said axle against axial movement relative thereto, means for selectively permitting or preventing relative rotation of said axle and said male plug, a bearing receiving section on said axle outwardly of said male plug and adapted to receive a bearing for supporting a wheel, a nut threaded on said axle outwardly of said bearing receiving section, and means for preventing rotation of said nut on said axle.

8. The wheel adapter of claim 7, and a means on said axle for facilitating rotation thereof.

9. The wheel adapter of claim 1 wherein said detent means is mounted at the outer end of said male plug, spring means urging said detent means into engagement with said splines, a recess in the top surface of said male plug disposed transversely to the bore therein, a holding pin connected to said detent means and supported within said recess whereby said detent means may be raised against the urging of said spring means and rotated so that said holding pin is disengaged from said recess thereby maintaining said detent means out of engagement with said splines.

References Cited in the file of this patent

UNITED STATES PATENTS

| | | |
|---|---|---|
| 695,081 | Reese | Mar. 11, 1902 |
| 710,431 | Cornett et al. | Oct. 7, 1902 |
| 1,358,092 | Millard | Nov. 9, 1920 |
| 2,115,864 | Livermon | May 3, 1938 |
| 2,442,903 | O'Harrow | June 8, 1948 |
| 2,515,564 | Mercer et al. | July 18, 1950 |
| 2,603,505 | Arrowood | July 15, 1952 |